Sept. 25, 1956   M. I. GLASS ET AL   2,763,959
MUSICAL TOY
Filed Sept. 14, 1955   3 Sheets-Sheet 1
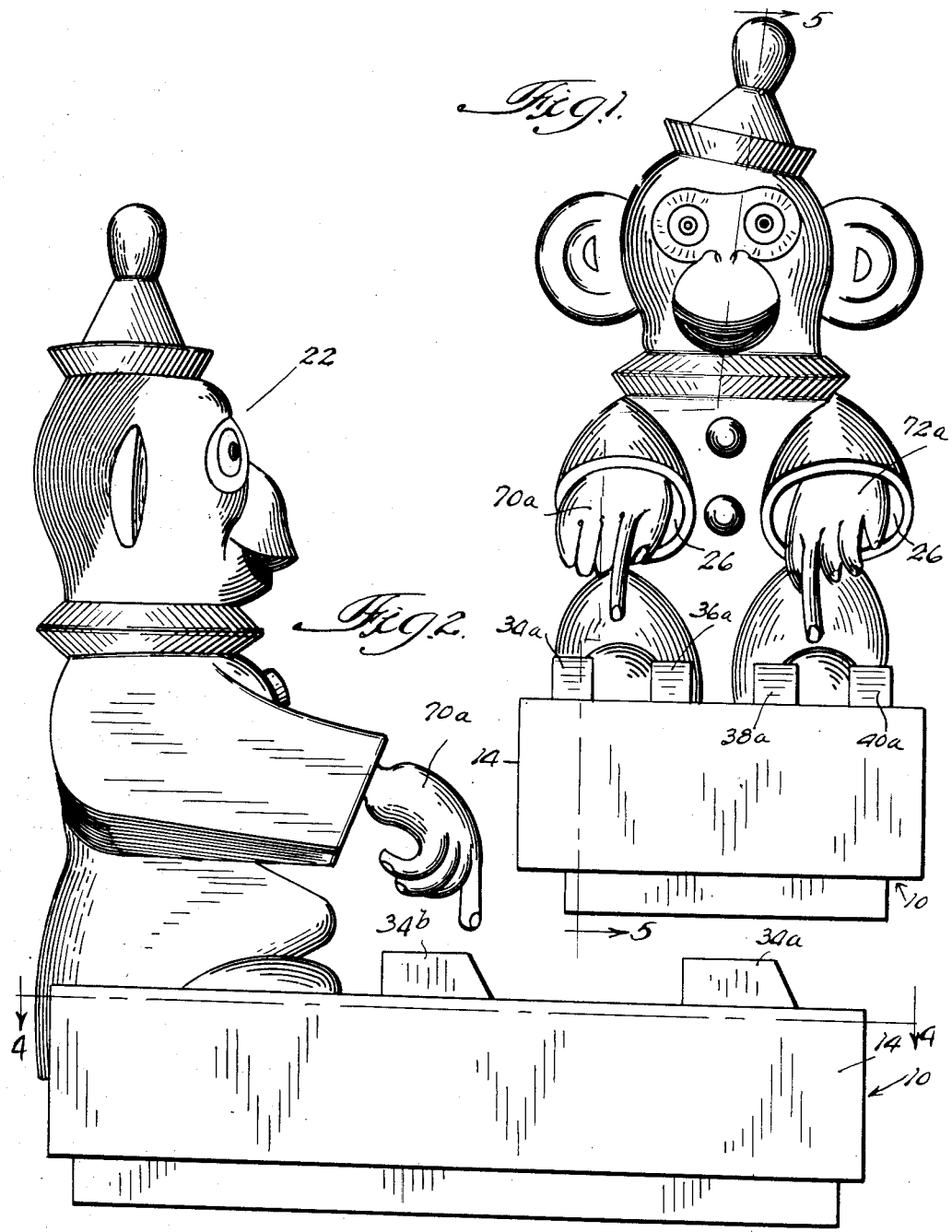
INVENTORS.
Marvin I. Glass &
BY Charles Pearson Jr.
Max R. Kraus Sept. 25, 1956
M. I. GLASS ET AL
2,763,959
MUSICAL TOY
Filed Sept. 14, 1955
3 Sheets-Sheet 2
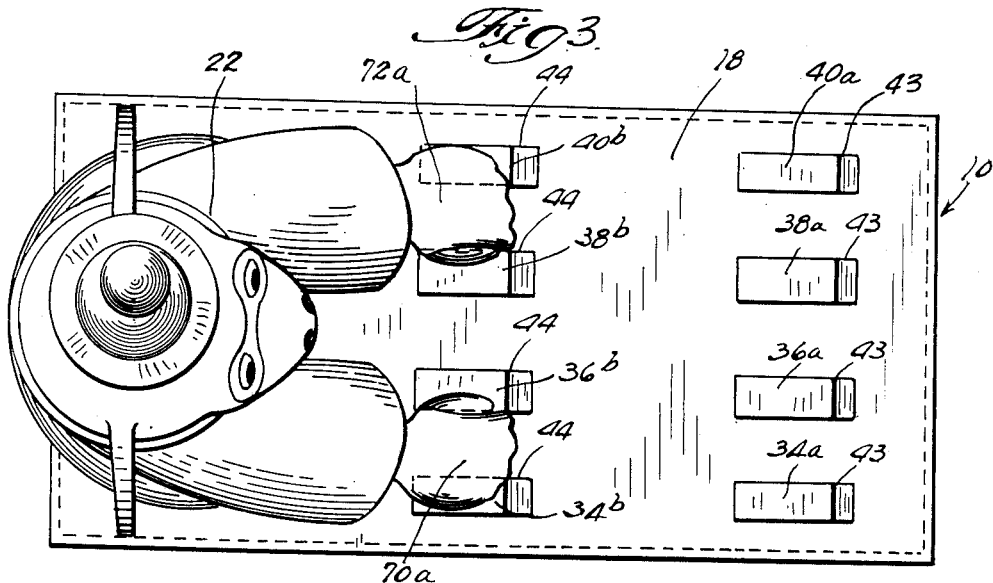
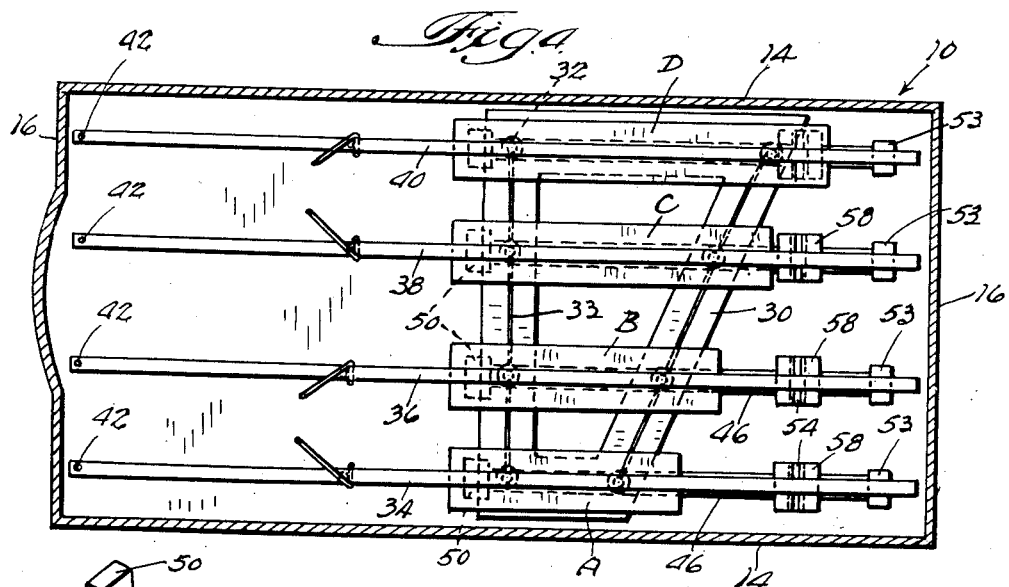
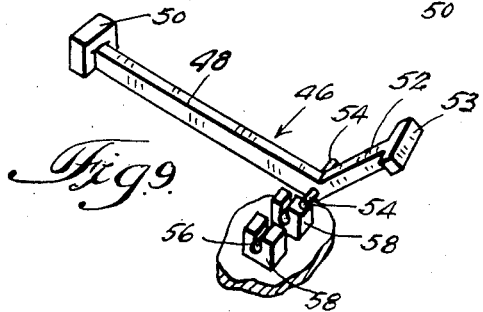
INVENTORS
Marvin I. Glass &
BY Charles Pearson Jr.

Sept. 25, 1956　　　M. I. GLASS ET AL　　　2,763,959
MUSICAL TOY
Filed Sept. 14, 1955　　　　　　　　　　　3 Sheets-Sheet 3
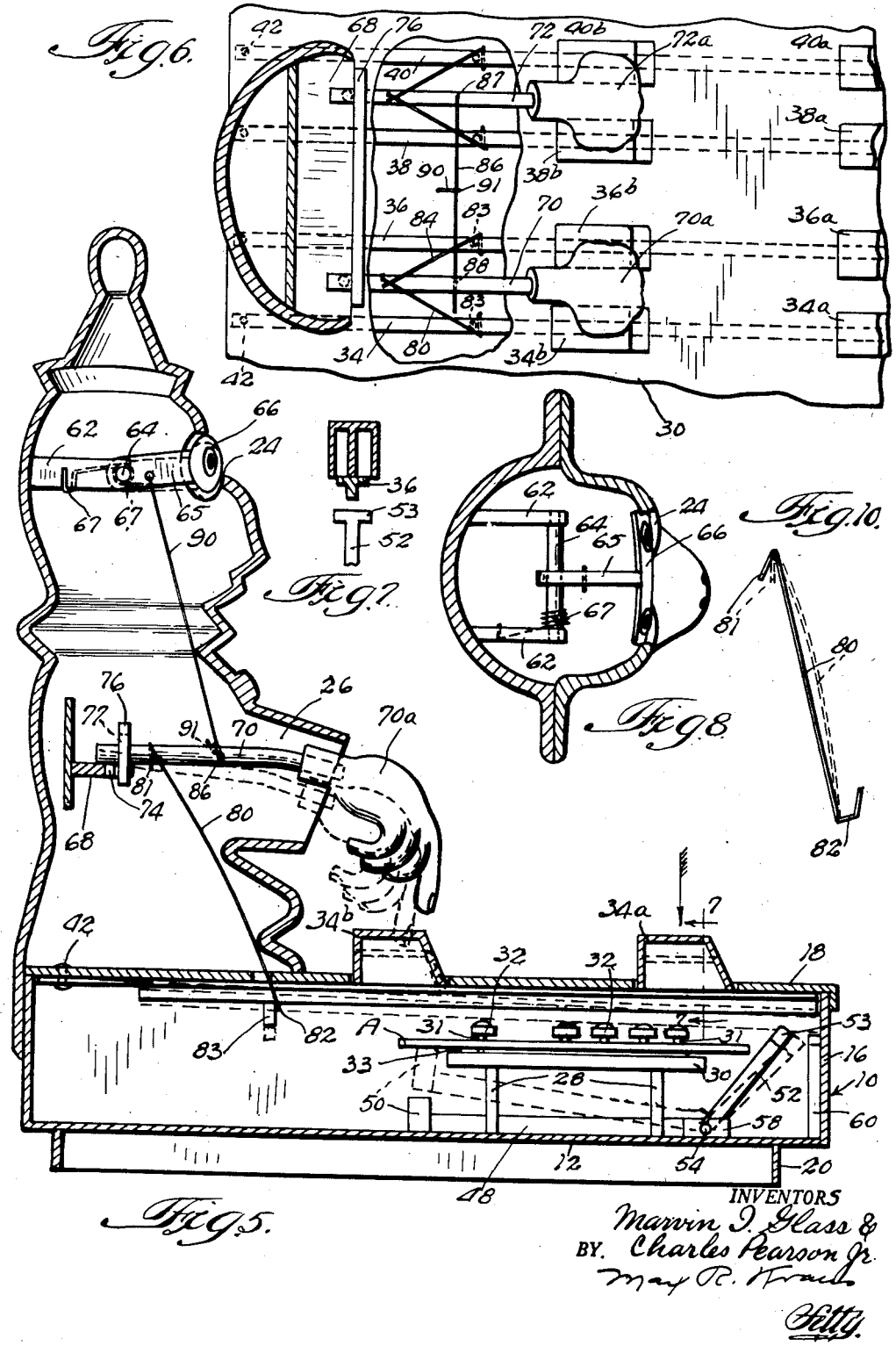
INVENTORS
Marvin I. Glass &
BY Charles Pearson Jr.

United States Patent Office 2,763,959
Patented Sept. 25, 1956

2,763,959
MUSICAL TOY

Marvin I. Glass and Charles Pearson, Jr., Chicago, Ill.

Application September 14, 1955, Serial No. 534,241

8 Claims. (Cl. 46—118)

This invention relates to a musical toy.

One of the objects of this invention is to provide a musical toy having a toy figure which tends to parrot or simulate the actions of the child in playing the toy and giving the appearance that the toy figure is playing said musical instrument simultaneously with the child.

Another object of this invention is to provide a musical toy played by the child by depressing a plurality of playing keys to produce musical tones, which toy has a toy figure positioned facing the child, in front of a duplicate set of keys and wherein the hands of the toy figure move across and appear to depress the duplicate keys simultaneously with the depressing of the playing keys by the child.

Another object of this invention is to provide a musical toy of the foregoing character in which the eyes of the toy figure are caused to move and look towards the keys in front of the toy figure when the child is playing the toy.

Another object of this invention is to provide a musical toy having a toy figure which appears to serve as a playmate companion for the child while it is playing the toy.

It is well known that young children like to have playmates as companions during their play period, consequently it is one of the objects of this invention to provide a musical toy which not only will encourage the child to play the musical toy and thus tend to develop a liking and appreciation for musical tones but will also tend to give the child the impression that it is playing with a companion and thereby tend to encourage the child in the use of the toy and furthermore tend to occupy the child's attention while playing alone. It is well recognized that the psychology of mimicry plays a great part in the education of the child in that the child will tend to imitate or ape or mimic the things that it sees done. With this invention the child sees before it a toy figure which appears to play the musical instrument and does so simultaneously with the child, thus the child is encouraged to do likewise.

Another object of this invention is to provide a musical toy instrument which provides great play value and affords amusement for the child, at the same time encouraging the child in the appreciation of musical tones.

Another object of this invention is to provide a very simple and inexpensive musical toy instrument of the foregoing characteristics.

Other objects will become apparent as this description progresses.

In the drawings:

Fig. 1 is a front view of the toy.

Fig. 2 is a side view thereof.

Fig. 3 is a top plan view thereof.

Fig. 4 is a view taken on lines 4—4 of Fig. 2.

Fig. 5 is a view taken on lines 5—5 of Fig. 1.

Fig. 6 is a view taken on lines 6—6 of Fig. 5.

Fig. 7 is a view taken on lines 7—7 of Fig. 5.

Fig. 8 is a view taken on lines 8—8 of Fig. 5.

Fig. 9 is a perspective view of one of the hammers and its support, and

Fig. 10 is a perspective view of the wire member connecting the arm to the key supporting bar.

The toy is made preferably of a plastic material although other material may be used. The base generally indicated at 10 comprises a rectangular shaped box housing having a bottom 12, side and end walls 14 and 16 respectively and a top cover member 18. An inwardly offset supporting frame 20 depends from the bottom 12.

Fixedly secured to the base is a hollow figurine in the representation of a monkey generally indicated at 22, which has an enlarged head opening or slot 24 adjacent the eye portion of the head. The figurine has a pair of hollow sleeve members 26 within which fit the movable hands presently to be described.

Secured to the bottom 12 of the base housing 10 are a plurality of spaced vertical studs 28 which support a harp shaped frame member 30. The harp frame member 30 has upwardly extending pins 31 which loosely receive 4 metal sound plates designated by the letters A, B, C and D, best shown in Fig. 4. The sound plates each have openings in which are received the pins 31 and the openings are slightly of greater circumference than the pins 31 to permit movement of the sound plates with respect thereto. The tops of the pins 31 have heads and felt washers 32 to limit the upward movement of the sound plates. The sound plates are each of different lengths and each plate when struck sounds a different musical note. A string 33 is framed around the pins 31 under the sound plates so that the sound plate will rest on the string instead of on the harp frame 30.

Secured to the underside of the top cover 18 are 4 spaced longitudinal key supporting bars designated by numerals 34, 36, 38 and 40, each of which is T shape in transverse cross section (as best shown in Fig. 7) for a major portion of its length. The rear of each bar is flat and so formed that when secured to the underside of the top cover 18 by pin 42 it will be stressed to provide a spring to maintain a normal horizontal position. All the bars are similarly secured.

The top cover 18 is provided with 4 spaced slots, all indicated by the numeral 43. Each slot is in alignment with one of the longitudinal key supporting bars 34, 36, 38 and 40. Secured to each of the bars is a key which is accommodated in its respective slot 43. The first series of keys are identified by the numerals 34a, 36a, 38a and 40a and are respectively mounted on the key supporting bars with the corresponding principal numbers.

The top cover member 18 has rearwardly of the first mentioned slots 43 and in spaced alignment therewith 4 additional slots, all identified by the numeral 44, which accommodate a second series of keys 34b, 36b, and 40b mounted respectively on the bars 34, 36, 38 and 40.

By manually depressing any of the keys 34a to 40a the corresponding key bar is depressed and the companion key 34b to 40b will be simultaneously moved downward.

Mounted under each of the key supporting bars 36 to 40 to be actuated by said bar is a sound actuating member each being generally designated by the numeral 46, best shown in Figs. 5 and 9 which includes an arm 48 which supports a hammer 50 on the end thereof. Secured to the opposite end of the arm 48 is an inclined extension 52 having a T shaped end 53 which is adapted to be engaged by the key supporting bars 34 to 40 when the key is depressed. The arm 48 has a pair of oppositely directed pins 54 which fit in slots 56 of blocks 58 secured to the bottom 12 to pivotally support the sound actuating member 46. There are 4 actuating members 46, one for each of the bars 36 to 40 and all are similarly constructed and similarly supported.

The arms 48 are of equal lengths and the hammer 50 carried by each respective arm 48 is positioned under its respective sound plate which it is to strike. In normal position the actuating member 46 is positioned as shown in full lines in Fig. 5 with the arm 48 resting on the base 12. By depressing any of the keys 34a to 40a, the corresponding bar is moved downwardly engaging the T end 53 of the upward extension 52, causing the actuating member 46 to pivot as shown in dotted lines in Fig. 5 so that the hammer 50 strikes the underside of the respective musical sound plate A, B, C or D. A wall 60 secured to the end wall 16 limits the downward movement of the actuating member 46.

Inside the head portion of the toy figure as best shown in Figs. 5 and 8 is a pair of arms 62 secured to the rear wall of the head portion which rockably supports a transverse rod 64 to which is fixedly secured an arm 65 which supports on the end thereof an eye piece generally designated by the numeral 66 which spans the opening 24 in the front of the head and which has painted or otherwise secured thereon a pair of simulated eyes. A coil spring 67 is secured on the rod 64, one end of the spring is anchored to the rod 64 and the other end in engagement with one of the arms 62 to normally maintain the eye piece 66 in the elevated position shown in Fig. 5.

Secured internally of the body of the figurine as best seen as in Figs. 5 and 6 rearwardly of the sleeves 26 is a shelf 68 which supports a pair of arms 70 and 72. Each of the arms has a downwardly extending pin 74 which loosely fits into an opening 75 in the shelf 68. A transverse bar 76 extends over the arms and is secured to the shelf 68 and said bar has a pair of enlarged slots 77 through which the arms 70 and 72 extend. Each of the arms 70 and 72 extends forwardly through the sleeves 26 of the toy figure and supports on the end thereof a simulated hand 70a and 72a which extends forwardly of the sleeve with the index finger of each hand pointing downwardly as shown and extending over the second series of keys 34b to 40b.

Secured to the arm 70 is a spring wire member 80 best shown in Figs. 5, 6 and 10 which has a downwardly bent portion 81 secured in a slot in the arm 80. The lower end of the wire member 80 has a U-shaped bend 82 which engages the underside of the key supporting bar 34. A pin 83 on the underside of the key supporting bar engages the U-shaped bend 82 of the wire member 80. Also secured to the arm 70 is another wire member 84 which is shaped similar to wire member 80 and is similarly secured to the arm 70 and to the key supporting bar 36. As best shown in Fig. 6, the wire members 80 and 84 cross each other adjacent their connection with the arm 70 so that when the key bar 34 is depressed the arm 70 will through the wire member 80 be shifted slightly to the right as viewed in Fig. 6 so that the hand 70a and its finger is positioned directly over the key 34b in front of the toy figurine and moved downwardly over said key. When the bar 36 is depressed by the key 36a, the wire member 84 will move the arm 70 to the left to position it over key 36b and said hand and finger will be moved downwardly over said key.

The arm 72 is similarly connected by similar wire members to the key supporting bars 38 and 40 to cause the hand 72a and finger thereon to move similarly with respect to keys 38b and 40b. Each hand 70a and 72a operates independently of the other hand.

In normal position the key supporting bars 36 to 40 are maintained in a horizontal position as shown in full lines in Fig. 5 and through the wire members 80 and 82 maintain the arms 70 and 72 in their elevated position as shown in Fig. 5. When the keys 34a to 40a are depressed the arms 70 and 72 shift and depress as shown in dotted lines in said figure.

A cross wire member 86 is secured as at 87 to the arm 72 with the opposite end of said wire loosely passing through an opening 88 in the arm 70.

Connected to the arm 65 is a string or other connecting member 90 which has its opposite end connected as at 91 to the cross wire 86. Thus when either of the arms 70 and 82 are moved to depressed position, they will through cross wire 86 and connecting member 90 move the eye piece 66 downwardly against the tension of coil spring 66, which eye piece will be restored to normal position when the arms 70 or 72 are restored to normal position. When the eye piece 66 is moved downwardly the eyes thereon will be looking in the direction of the keys which the toy figure is apparently depressing namely keys 34b to 40b.

Normally each arm 70 and 72 is respectively positioned between two adjacent bars so that the finger of the hand is in a vertical position between the two adjacent second series or simulated keys. For example arm 70 and hand 70a is positioned between keys 34b and 36b and arm 72 and hand 72a is positioned between keys 38b and 40b. By depressing key 34a the bar 34 will be moved downwardly and with it will move key 34b on the same bar. The depression of said bar will simultaneously through wire 80 connected to said bar cause the arm 70 and hand 70a to shift slightly laterally over the key 34b to move downwardly over said key giving the impression that said key has been depressed by the finger of the hand. As the bar 34 is depressed it will strike the T end 53 of the corresponding actuator 48 to pivot same so that the hammer 50 thereon strikes the musical plate A to produce a musical sound. Simultaneously as the arm 70 moves down it will through cross wire 86 and connector 90 move the eye piece 66 down slightly so that the eyes on the eye piece appear directed to the key 34b.

When the child depresses key 36a the hand 70a will shift slightly over key 36b and a similar action will take place with musical plate B being struck to produce a musical sound.

A corresponding action is produced by striking keys 38a and 40a to strike musical plates C and D respectively.

Thus as the child is depressing and playing the keys 34a to 40a, the companion corresponding keys 34b to 40b appear to be depressed by the toy monkey with the monkey's hands shifting and depressing same to produce the musical notes giving the child the impression that the toy monkey is playing with him and providing a highly amusing and entertaining toy for the child.

It will be understood that various changes and modifications may be made from the foregoing without departing from the spirit and scope of the appended claims.

We claim:

1. In a musical toy of the character described comprising a housing, a first set of keys and a second set of keys extending upwardly of said housing, means within said housing operated upon depression of said first set of keys for producing different musical notes, said second set of keys being operatively connected to said first set of keys so that corresponding keys on said second set of keys are depressed when said first set of keys are depressed, a toy figure facing said second set of keys, said toy figure having arms movable with respect to said second set of keys and so constructed and arranged that said arms move over said second set of keys and depress downwardly with respect to same to correspond to the depressing of said first mentioned set of keys.

2. In a toy of the character described comprising a first set of keys adapted to be manually depressed, a second set of keys arranged adjacent to said first set of keys and adapted to be simultaneously depressed when said first set of keys are depressed, a toy figure positioned adjacent said second set of keys, said toy figure having a pair of movable arms and means controlled by the depression of said first mentioned keys to move said arms over said second set of keys and depressing said arms to correspond with the depression of said first set of keys.

3. In a musical toy of the character described comprising a set of keys adapted to be manually depressed to produce a musical sound, a second set of keys depressible with said first mentioned set of keys, a toy figure positioned facing said second set of keys, said toy figure having hands which are actuated by the depressing of said first mentioned set of keys, said hands moving in relation to said second set of keys to simulate depressing said keys to correspond to the manual depression of said first set of keys.

4. In a musical toy of the character described comprising a set of keys adapted to be manually depressed to produce a musical sound, a second set of keys depressible with said first mentioned set of keys, a toy figure positioned facing said second set of keys, said toy figure having hands which are actuated by the depressing of said first mentioned set of keys, said hands moving in relation to said second set of keys to simulate depressing said keys to correspond to the manual depression of said first set of keys, said toy figure having movable eyes and means for moving said eyes in the direction of said second set of keys as said first mentioned keys are depressed.

5. In a musical toy of the character described comprising a first set of keys adapted to be manually actuated, a second set of keys in parallel arrangement with said first set of keys adapted to be actuated when said first keys are actuated, a toy figure facing said second set of keys, said toy figure having a pair of hands positioned in relation to said second set of keys so that said hands move as though depressing said second set of keys simultaneously with the depressing of said first set of keys.

6. In a musical toy of the character described comprising a set of four keys adapted to be manually depressed to produce musical sounds, a second set of four keys arranged rearwardly of said first mentioned keys and in alinement therewith, a toy figure facing said second set of keys, said toy figure having a pair of hands positioned over said second pair of keys with each hand positioned in relation to two keys, means actuating said hands when said first mentioned keys are depressed so that each hand is moved in relation to two of the second set of keys and to move downwardly in relation to same simultaneously with the depressing of the corresponding key of the first mentioned set of keys.

7. In a musical toy of the character described comprising a housing, a plurality of bars positioned within said housing and adapted when depressed to produce a musical sound, a first series of keys secured to said bars and adapted to be manually depressed, a second series of keys secured to said bars and moving to depressed position when said first keys are depressed, a toy figure facing said second series of keys, said figure having a pair of arms positioned in relation to said second series of keys and so constructed and arranged that when said first series of keys are depressed said arms will move in relation to said second depressed keys so as to give the impression that said second series of keys are simultaneously being depressed by said hands.

8. In a toy of the character described comprising a first set of keys adapted to be manually depressed, a second set of keys arranged adjacent to said first set of keys and adapted to be simultaneously depressed when said first set of keys are depressed, a toy figure positioned adjacent said second set of keys, said toy figure having a movable arm and means controlled by the depression of said first mentioned keys to move said arm over said second set of keys and depressing said arm to correspond with the depression of said first set of keys.

No references cited.